(12) United States Patent
Hano (10) Patent No.: US 11,283,347 B2
(45) Date of Patent: Mar. 22, 2022

(54) CONTROL CIRCUIT FOR SUPPLYING VCC (71) Applicant: Mitsubishi Electric Corporation, Tokyo (JP)

(72) Inventor: Mitsutaka Hano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 803 days.

(21) Appl. No.: 15/562,597

(22) PCT Filed: Jul. 15, 2015

(86) PCT No.: PCT/JP2015/070285
§ 371 (c)(1),
(2) Date: Sep. 28, 2017

(87) PCT Pub. No.: WO2017/009979
PCT Pub. Date: Jan. 19, 2017

(65) Prior Publication Data
US 2018/0091035 A1    Mar. 29, 2018

(51) Int. Cl.
| H02M 1/36 | (2007.01) |
| H02M 3/155 | (2006.01) |
| H02M 1/08 | (2006.01) |
| H02M 1/42 | (2007.01) |
| H02M 3/156 | (2006.01) |
| H02M 1/00 | (2006.01) |

(52) U.S. Cl.
CPC .............. *H02M 1/36* (2013.01); *H02M 1/08* (2013.01); *H02M 1/4225* (2013.01); *H02M 3/155* (2013.01); *H02M 3/156* (2013.01); *H02M 1/0006* (2021.05)

(58) Field of Classification Search
CPC .............................. H02M 1/36; H02M 1/0006
See application file for complete search history.

(56) References Cited

U.S. PATENT DOCUMENTS

2006/0279237 A1*  12/2006  Kao ...................... H02M 3/00
                                                                      315/307
2007/0170978 A1*  7/2007  Furuichi ................ G11C 5/143
                                                                      327/530
(Continued)

FOREIGN PATENT DOCUMENTS

CN         103683949 A        3/2014
CN         104660073 A        5/2015
(Continued)

OTHER PUBLICATIONS

International Search Report issued in PCT/JP2015/070285; dated Oct. 13, 2015.
(Continued)

*Primary Examiner* — Rafael O De Leon Domenech
(74) *Attorney, Agent, or Firm* — Studebaker & Brackett PC (57) ABSTRACT

A control circuit of the present invention includes a drive circuit for outputting a gate drive signal, a charging circuit for generating a charging current when the drive circuit is started up, and a Vcc control circuit for, upon receiving an output from the charging circuit, outputting a control signal for supplying Vcc for the drive circuit, wherein the drive circuit, the charging circuit, and the Vcc control circuit are provided in one chip.

16 Claims, 5 Drawing Sheets

(56) References Cited

U.S. PATENT DOCUMENTS

| | | | |
|---|---|---|---|
| 2008/0197895 A1* | 8/2008 | Zhu | H03K 17/223 |
| | | | 327/143 |
| 2008/0265975 A1 | 10/2008 | Takasu et al. | |
| 2009/0033291 A1* | 2/2009 | Aradachi | H02J 7/0077 |
| | | | 320/150 |
| 2009/0033377 A1 | 2/2009 | Hashimoto et al. | |
| 2009/0102428 A1* | 4/2009 | Aradachi | H02J 7/0091 |
| | | | 320/153 |
| 2011/0276191 A1* | 11/2011 | Zushi | G05B 9/02 |
| | | | 700/293 |
| 2012/0105040 A1* | 5/2012 | Leipold | H02M 3/1584 |
| | | | 323/284 |
| 2012/0262082 A1* | 10/2012 | Esaki | H05B 45/14 |
| | | | 315/224 |
| 2013/0257304 A1* | 10/2013 | Takahashi | H02M 3/1563 |
| | | | 315/206 |
| 2015/0028925 A1* | 1/2015 | Utani | H03K 17/687 |
| | | | 327/143 |
| 2015/0068278 A1* | 3/2015 | Yazawa | F02P 19/027 |
| | | | 73/23.32 |
| 2015/0091461 A1* | 4/2015 | Nakamura | H05B 45/375 |
| | | | 315/200 R |
| 2015/0131334 A1* | 5/2015 | Saji | H02M 1/08 |
| | | | 363/21.01 |
| 2015/0171760 A1 | 6/2015 | Imanaka | |
| 2016/0018876 A1* | 1/2016 | Strijker | H02M 1/36 |
| | | | 713/323 |
| 2016/0079785 A1* | 3/2016 | Kinzer | H01L 23/62 |
| | | | 320/107 |
| 2016/0360583 A1* | 12/2016 | Kato | H05B 33/0815 |
| 2017/0288434 A1* | 10/2017 | Narita | H02M 1/08 |
| 2017/0367154 A1* | 12/2017 | Huang | H05B 45/395 |
| 2018/0026523 A1* | 1/2018 | Nate | H02M 3/33523 |
| | | | 318/504 |

FOREIGN PATENT DOCUMENTS

| | | |
|---|---|---|
| JP | 2002-051541 A | 2/2002 |
| JP | 2008-278552 A | 11/2008 |
| JP | 2009-021823 A | 1/2009 |
| JP | 2009-189119 A | 8/2009 |
| JP | 2012-186183 A | 9/2012 |
| JP | 2015-104173 A | 6/2015 |

OTHER PUBLICATIONS

Notification of Transmittal of Translation of the International Preliminary Report on Patentability (Chapter 1) and Translation of Written Opinion of the International Searching Authority; PCT/JP2015/070285; dated Jan. 25, 2018.

An Office Action; "Notification of Reasons for Refusal," issued by the Japanese Patent Office dated Jul. 17, 2018, which corresponds to Japanese Patent Application No. 2017-528080 and is related to U.S. Appl. No. 15/562,597; with English language translation.

An Office Action mailed by the State Intellectual Property Office of the People's Republic of China dated Jun. 25, 2019, which corresponds to Chinese Patent Application No. 201580081679.4 and is related to U.S. Appl. No. 15/562,597; with English translation.

An Office Action mailed by the State Intellectual Property Office of the People's Republic of China dated Jun. 25, 2019, which corresponds to Chinese Patent Application No. 20158081679.4 and is related to U.S. Appl. No. 15/562,597; with English translation.

* cited by examiner

CONTROL CIRCUIT FOR SUPPLYING VCC

FIELD

This invention relates to a control circuit, for example, used for voltage conversion in an inverter system or the like, or for use in an LED system or the like.

BACKGROUND

Patent Literature 1 discloses a gate drive circuit. This gate drive circuit controls the application timing of gate voltages applied to a Hi-MOSFET and a Lo-MOSFET and voltage values thereof based on signals Vg1', Vg2', Vp1, and Vp2 outputted from a PWM waveform generator, and applies gate voltages of predetermined voltage values to the Hi-MOSFET and the Lo-MOSFET with predetermined timing.

PRIOR ART

Patent Literature

Patent Literature 1: Japanese Patent Laid-Open No. 2008-278552

SUMMARY

Technical Problem

A high-breakdown-voltage gate driver IC (hereinafter also referred to as a drive circuit), which is optimal for a system such as an LED system, directly controls a power device. A power supply (Vcc) to the drive circuit is often controlled by an IPD (Intelligent Power Device) provided independent from the drive circuit. In that case, the system and the IPD need to be independently controlled, and there has been a problem that system management becomes difficult.

Further, in the case where the drive circuit and a circuit for supplying Vcc to the drive circuit are formed in one chip to reduce the board space, the stable supply of predetermined Vcc is required.

The present invention has been accomplished to solve the above-described problems, and an object of the present invention is to provide a control circuit which can stably supply predetermined Vcc and which is suitable for reducing the board space.

Means for Solving the Problems

According to a present invention, a control circuit includes a drive circuit for outputting a gate drive signal, a charging circuit for generating a charging current when the drive circuit is started up, and a Vcc control circuit for, upon receiving an output from the charging circuit, outputting a control signal for supplying Vcc for the drive circuit, wherein the drive circuit, the charging circuit, and the Vcc control circuit are provided in one chip.

According to another aspect of the present invention, a control circuit includes a drive circuit for outputting a gate drive signal, a Vcc circuit for supplying Vcc to the drive circuit, a first floating terminal connected to the drive circuit, and a second floating terminal connected to the Vcc circuit and insulated from the first floating terminal, wherein the drive circuit and the Vcc circuit are provided in one chip.

Other features of the present invention will become apparent from the following description.

Advantageous Effects of Invention

This invention provides a control circuit which includes a drive circuit and a Vcc control circuit provided in one chip, which can stably supply predetermined Vcc by using two floating terminals and monitoring Vcc with a feedback circuit, and which is suitable for reducing the board space.

DESCRIPTION OF THE EMBODIMENTS

Control circuits according to embodiments of the present invention will be described with reference to the drawings. The same or corresponding components will be denoted by the same reference signs, and the repetition of explanation thereof may be omitted.

Embodiment 1

Figure 1:
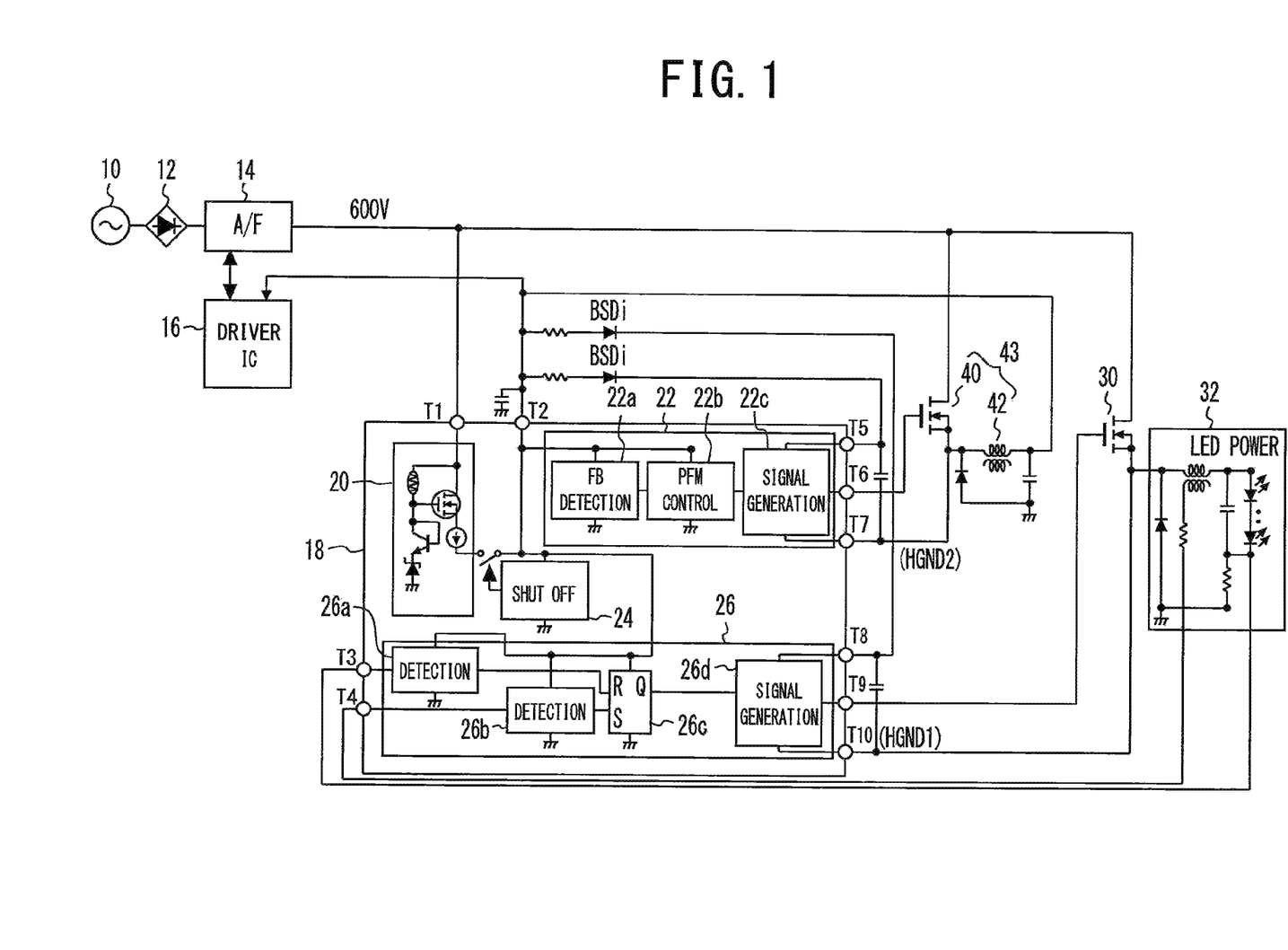
FIG. 1 is a circuit diagram of a control circuit and the like according to Embodiment 1.

FIG. 1 is a circuit diagram of a control circuit and the like according to Embodiment 1 of the present invention. A control circuit 18 is an integrated circuit (IC) in which a plurality of circuits having functions are integrated in one chip. The control circuit 18 has terminals T1 to T10 for electrical input and output to/from the outside. The control circuit 18 includes a drive circuit 26 for outputting a gate drive signal. The drive circuit 26 includes detection circuits 26a and 26b, an FF circuit 26c, and a signal generation circuit 26d. The drive circuit 26 is a high-breakdown-voltage gate driver IC (HVIC).

The drive circuit 26 controls a first power device 30. The drive circuit 26 is connected to a gate of the first power device 30 through the terminal T9. The drive circuit 26 (signal generation circuit 26d) is a circuit which generates a gate drive signal and applies the gate drive signal to the gate of the first power device 30 provided outside. The terminal T10, which supplies a floating potential, is connected to the drive circuit 26. The terminal T10 is referred to as a first floating terminal. The first floating terminal (terminal T10) is connected to a source of the first power device 30.

The control circuit 18 includes the terminal T1. The terminal T1 is connected to a commercial power source 10 (e.g., an AC 100-V external power source) through a rectifying circuit 12 and a voltage booster circuit 14. The control circuit 18 includes a charging circuit 20 connected to this terminal T1. The charging circuit 20 is configured using, for example, a constant current circuit. The voltage of the commercial power source 10 (supply voltage) is boosted to, for example, 600 V by the voltage booster circuit 14 and inputted to the charging circuit 20. The charging circuit 20 generates a charging current when the drive circuit 26 is started up. The charging current is used to raise (start up) Vcc to be supplied to the drive circuit 26.

The control circuit 18 includes a Vcc control circuit 22. The Vcc control circuit 22 is a circuit which outputs a signal for generating Vcc to be supplied to the drive circuit 26. The Vcc control circuit 22 includes an FB (FeedBack) detection circuit 22a, a PFM (Pulse Frequency Modulation) control circuit 22b, and a signal generation circuit 22c. The signal generation circuit 22c is connected to a gate of a second power device 40 through the terminal T6. The signal generation circuit 22c is a circuit which generates a control signal and applies the control signal to the gate of the second power device 40 through the terminal T6. A drain of the second power device 40 is connected to the voltage booster circuit 14. It should be noted that the aforementioned first power device 30 and the second power device 40 are preferably high-breakdown-voltage power devices such as power MOSFETs or IGBTs.

The terminal T7, which supplies a floating potential, is connected to the Vcc control circuit 22. The terminal T7 is referred to as a second floating terminal. The second floating terminal (terminal T7) is connected to a source of the second power device 40. The second floating terminal (terminal T7) is a terminal insulated from the first floating terminal (terminal T10). Accordingly, potential variation at the first floating terminal (terminal T10) does not affect the potential at the second floating terminal (terminal T7), and potential variation at the second floating terminal does not affect the potential at the first floating terminal.

A voltage conversion portion 42 is connected to the source of the second power device 40. The voltage conversion portion 42 generates Vcc to be supplied to the drive circuit 26, in response to the switching of the second power device 40. The second power device 40 and the voltage conversion portion 42 are collectively referred to as an external converter 43. The term "external" means being located outside the control circuit 18.

Operations of the Vcc control circuit 22 and the external converter 43 will be described. The Vcc control circuit 22 starts operating upon receiving an output of the charging circuit 20. Specifically, the signal generation circuit 22c generates a control signal, and applies the control signal to the gate of the second power device 40. In response to this, the external converter 43 generates Vcc (e.g., 15 V). The generated Vcc is supplied to the drive circuit 26 through the terminal T2.

At this time, the FB circuit 22a and the PFM control circuit 22b, both connected to the terminal T2, detect Vcc. The FB circuit 22a and the PFM control circuit 22b transmit a signal to the signal generation circuit 22c so that the detected Vcc may have a predetermined value. For example, the FB circuit 22a and the PFM control circuit 22b notify the signal generation circuit 22c of a necessary pulse period of the control signal for realizing predetermined Vcc. The FB circuit 22a and the PFM control circuit 22b function as a feedback circuit. The feedback circuit is not particularly limited as long as the feedback circuit detects Vcc, determines whether Vcc is appropriate, and, if Vcc is not appropriate, notifies the signal generation circuit 22c. The feedback circuit may have a configuration using circuits other than the FB circuit 22a and the PFM control circuit 22b.

The control circuit 18 includes a shut off circuit 24 for shutting off the charging current. The shut off circuit 24 breaks the connection between the charging circuit 20 and the drive circuit 26 when the charging current of the charging circuit 20 reaches a predetermined value. Specifically, a switch is provided in the wiring that connects the charging circuit 20 and the drive circuit 26, and the shut off circuit 24 breaks the connection between the charging circuit 20 and the drive circuit 26 by turning off the switch.

The control circuit 18 is formed by providing the above-described drive circuit 26, charging circuit 20, shut off circuit 24, and Vcc control circuit 22 in one chip. The charging circuit 20, the shut off circuit 24, and the Vcc control circuit 22 are circuits which perform control for generating, from a voltage (e.g., 600 V) boosted by the voltage booster circuit 14, Vcc (e.g., 15 V) to be supplied to the drive circuit 26. If the "circuits which perform control for generating Vcc" are provided on a substrate different from that for the drive circuit 26, two substrates would be necessary and require a larger board space, and wiring for electrically connecting the substrates would also be necessary.

However, in Embodiment 1 of the present invention, since circuits (charging circuit 20, shut off circuit 24, and Vcc control circuit 22) which perform control for generating Vcc are incorporated into a chip in which the drive circuit 26 is formed, the number of components can be reduced, and board space can be reduced. Thus, costs can be reduced. Moreover, the circuits which perform control for generating Vcc and the drive circuit 26 can be controlled by a single IC. Accordingly, compared to the case where those circuits are controlled by different ICs, system management becomes easier. For example, management such as immediately stopping the drive circuit 26 when a problem occurs in the Vcc control circuit 22 can be easily performed.

Figure 2:
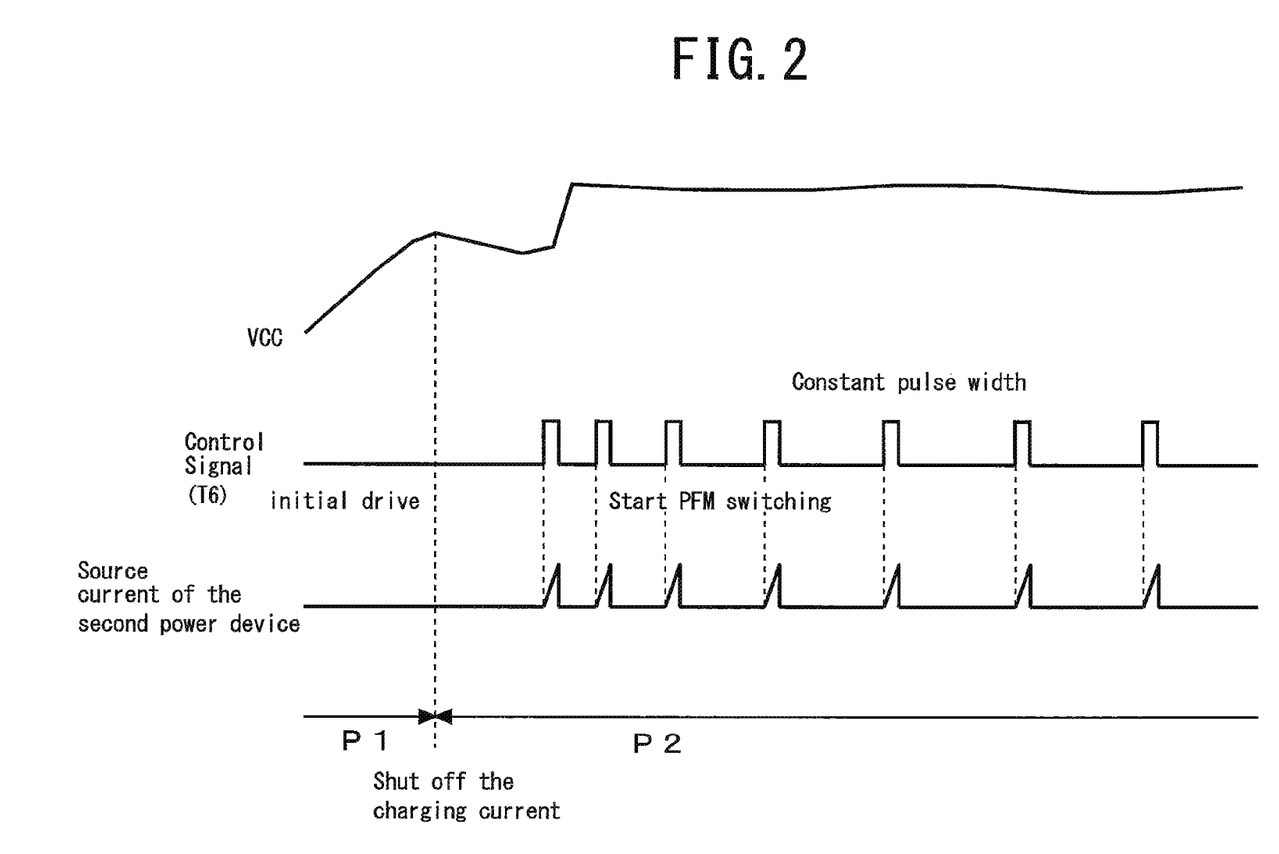
FIG. 2 is a timing diagram showing a Vcc control sequence.

FIG. 2 is a timing diagram showing a Vcc control sequence. The Vcc control sequence will be described with reference to FIG. 2. First, when Vcc is started up (when the drive circuit 26 is started up), the charging circuit 20 generates a charging current, thus raising Vcc. A first period P1, shown in FIG. 2, is a period during which the charging circuit 20 is operating. In the first period P1, the shut off circuit 24 does not operate, and the charging circuit 20 is connected to the Vcc control circuit 22 and the drive circuit 26.

When Vcc outputted from the charging circuit 20 reaches a predetermined value, the shut off circuit 24 breaks the connection between the charging circuit 20 and the drive circuit 26 and the connection between the charging circuit 20 and the Vcc control circuit 22. Then, a second period P2 starts. In the second period P2, Vcc is generated by the Vcc control circuit 22 and the external converter 43. In the second period P2, first, upon receiving an output from the charging circuit 20, the FB detection circuit 22a and the PFM control circuit (feedback circuit) starts operating, and the signal generation circuit 22c starts outputting a control signal. The control signal is applied to the gate of the second power device 40 provided in the external converter 43 located outside the control circuit 18. Further, a voltage generated by the external converter 43 is applied to the drive circuit 26 through the terminal T2. In short, the output from the external converter 43 is Vcc supplied to the drive circuit 26.

As described previously, the output from the external converter 43 is inputted to the feedback circuit (FB detection circuit 22a and PFM control circuit 22b). The feedback circuit determines whether Vcc is appropriate. If Vcc is not appropriate, the feedback circuit notifies the signal generation circuit 22c of a pulse period for realizing appropriate Vcc. Upon receiving the notification, the signal generation circuit 22c changes the pulse period of the control signal. FIG. 2 shows that the pulse width of the control signal is not changed, but the pulse width may be changed. The source current of the second power device 40 flows when the control signal is at a high level.

When Vcc is stably supplied from the external converter 43 to the drive circuit 26, the drive circuit 26 applies a gate drive signal to the gate of the high-breakdown-voltage power device (first power device 30) of the DC-DC converter. If the potential of the first floating terminal (terminal T10) is 600 V, the gate drive signal is set to approximately 615 V so that the gate voltage Vg of the first power device 30 may become higher than the source voltage Vs (600 V) by approximately 15 V. The potential of the first floating terminal (terminal T10) can have various values in the range of, for example, approximately 100 to 600 V. The turning on and off of the first power device 30 drives an LED power supply portion 32, thus realizing a desired light-emitting state.

During at least a period in which the first power device 30 is repeatedly turned on and off, the detection circuits 26a and 26b provided in the drive circuit 26 detect currents in a controlled portion (LED power supply portion 32) controlled by the first power device 30. Further, the drive circuit 26 outputs a gate drive signal so that the currents detected by the detection circuits 26a and 26b may have predetermined values.

If the chip on which both the Vcc control circuit 22 and the drive circuit 26 are mounted has just one floating terminal, the floating potential of the drive circuit would affect the floating potential of the Vcc control circuit, or the floating potential of the Vcc control circuit would affect the floating potential of the drive circuit. In such a case, the operation of the Vcc control circuit may become unstable.

To cope with this, in the control circuit 18 according to Embodiment 1 of the present invention, the first floating terminal (terminal T10) connected to the drive circuit 26 and the second floating terminal (terminal T7) connected to the Vcc control circuit 22 are insulated from each other. This prevents the floating potential of the Vcc control circuit 22 from being affected by the floating potential of the drive circuit 26. Accordingly, the operation of the Vcc control circuit 22 can be stabilized, and Vcc can be stably supplied.

As shown in FIG. 2, when the drive circuit 26 is started up (Vcc is raised), the charging circuit 20 operates first. In Embodiment 1 of the present invention, Vcc (e.g., 15 V) is generated from a high voltage, such as 600 V. Accordingly, if the charging circuit 20 continues to be used, the charging circuit 20 generates heat. For this reason, the charging circuit 20 cannot be made working over a long period of time.

To cope with this, in the control circuit 18 according to Embodiment 1 of the present invention, the charging circuit 20 is made working only when the drive circuit 26 is started up (Vcc is raised), and, when the output from the charging circuit 20 reaches a value less than 15 V but close to 15 V, the charging circuit 20 is turned off. The output from the charging circuit 20 triggers the operation of the Vcc control circuit 22. After the charging circuit 20 is turned off, Vcc is generated by the Vcc control circuit 22 and the external converter 43. Thus, heat generated by the control circuit 18 can be reduced.

Moreover, the Vcc control circuit 22 includes the feedback circuit (FB detection circuit 22a and PFM control circuit), and monitors whether Vcc which the Vcc control circuit 22 itself causes to be generated has a predetermined value. If Vcc departs from the predetermined value, the control signal is changed. Thus, predetermined Vcc can always be supplied.

The control circuit according to Embodiment 1 of the present invention can be variously modified. For example, the control circuit 18 preferably has two floating terminals, but may have just one floating terminal. In this case, the Vcc control circuit 22, which has a feedback function, contributes to the stable supply of Vcc.

Moreover, in the above-described example, the following circuits constitute a Vcc circuit for supplying Vcc to the drive circuit 26: a charging circuit connected to an external power source and configured to generate a charging current when the drive circuit is started up; a shut off circuit which breaks the connection between the charging circuit and the drive circuit when the output of the charging circuit reaches a predetermined value; and a Vcc control circuit which receives the output of the charging circuit and outputs a signal for supplying Vcc to the drive circuit. However, the Vcc circuit may have a configuration using circuits other than the charging circuit 20, the Vcc control circuit 22, and the shut off circuit 24. In this case, two floating terminals provided in the control circuit 18 contribute to the stable supply of Vcc.

A controlled portion controlled by the first power device 30 is not limited to the LED power supply portion 32. A wide variety of circuits including a DC-DC converter (chopper type) configuration and a half-bridge driver can be employed as the controlled portion. It should be noted that these modifications can also be applied to control circuits according to embodiments below.

The control circuits according to the embodiments below have many things in common with the control circuit of Embodiment 1, and therefore differences from Embodiment 1 will be mainly described.

Embodiment 2

Figure 3:
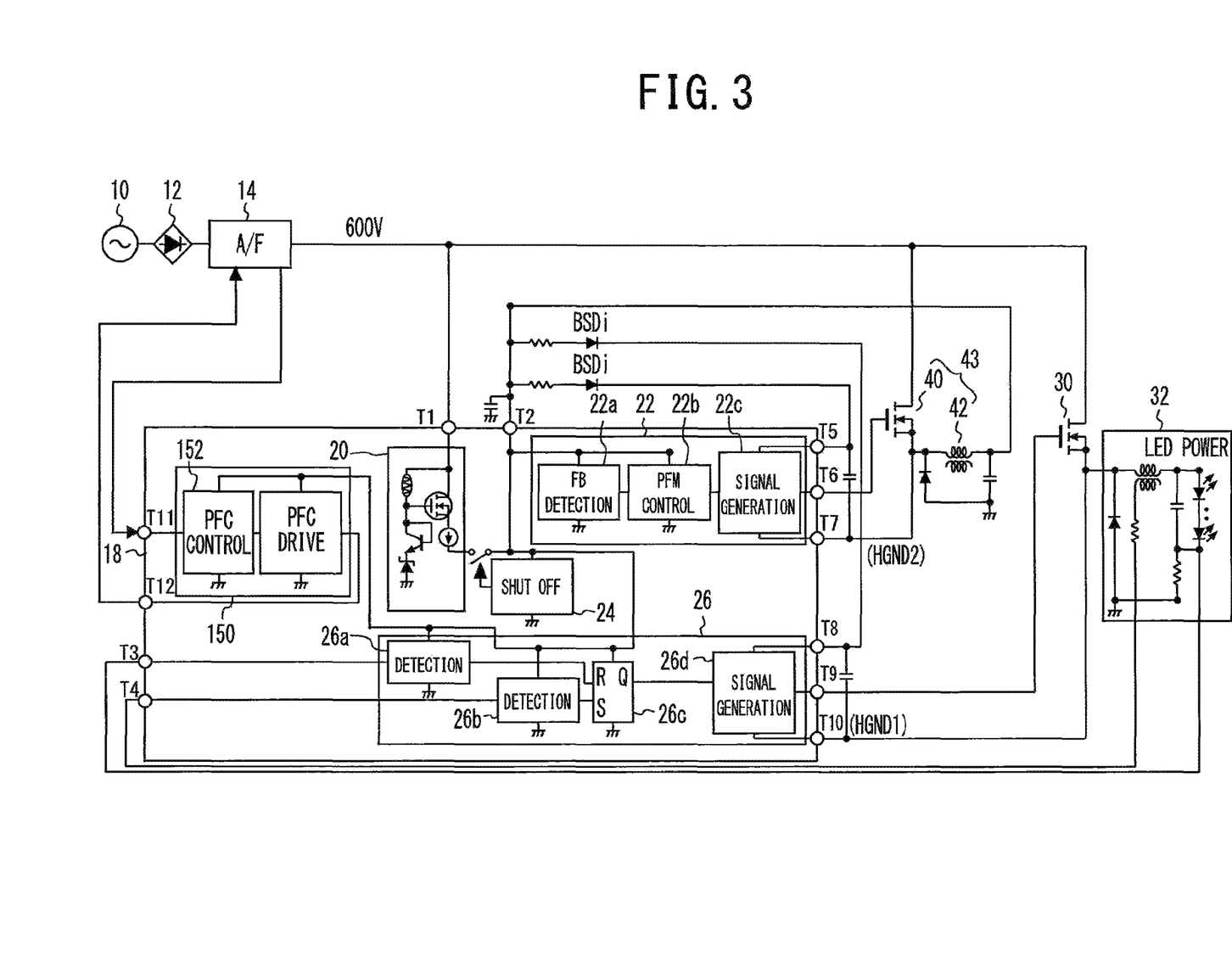
FIG. 3 is a circuit diagram of a control circuit and the like according to Embodiment 2.

FIG. 3 is a circuit diagram of a control circuit and the like according to Embodiment 2. The control circuit 18 includes a power factor improvement circuit 150. The power factor improvement circuit 150 includes a PFC drive circuit and a PFC control circuit 152. The power factor improvement circuit 150 is connected to the drive circuit 26 and terminals T11 and T12. The terminal T11 and the terminal T12 are connected to the voltage booster circuit 14. The power factor improvement circuit 150 is connected to the drive circuit 26 so as to monitor Vcc supplied to the drive circuit 26.

A feature of the control circuit 18 according to Embodiment 2 is that the power factor improvement circuit 150 for controlling the voltage booster circuit 14 is provided in the chip in which the control circuit 18 is formed. This feature makes it possible to reduce the number of components and the board space compared to the case where the power factor improvement circuit 150 and the control circuit 18 are provided on different substrates.

Embodiment 3

Figure 4:
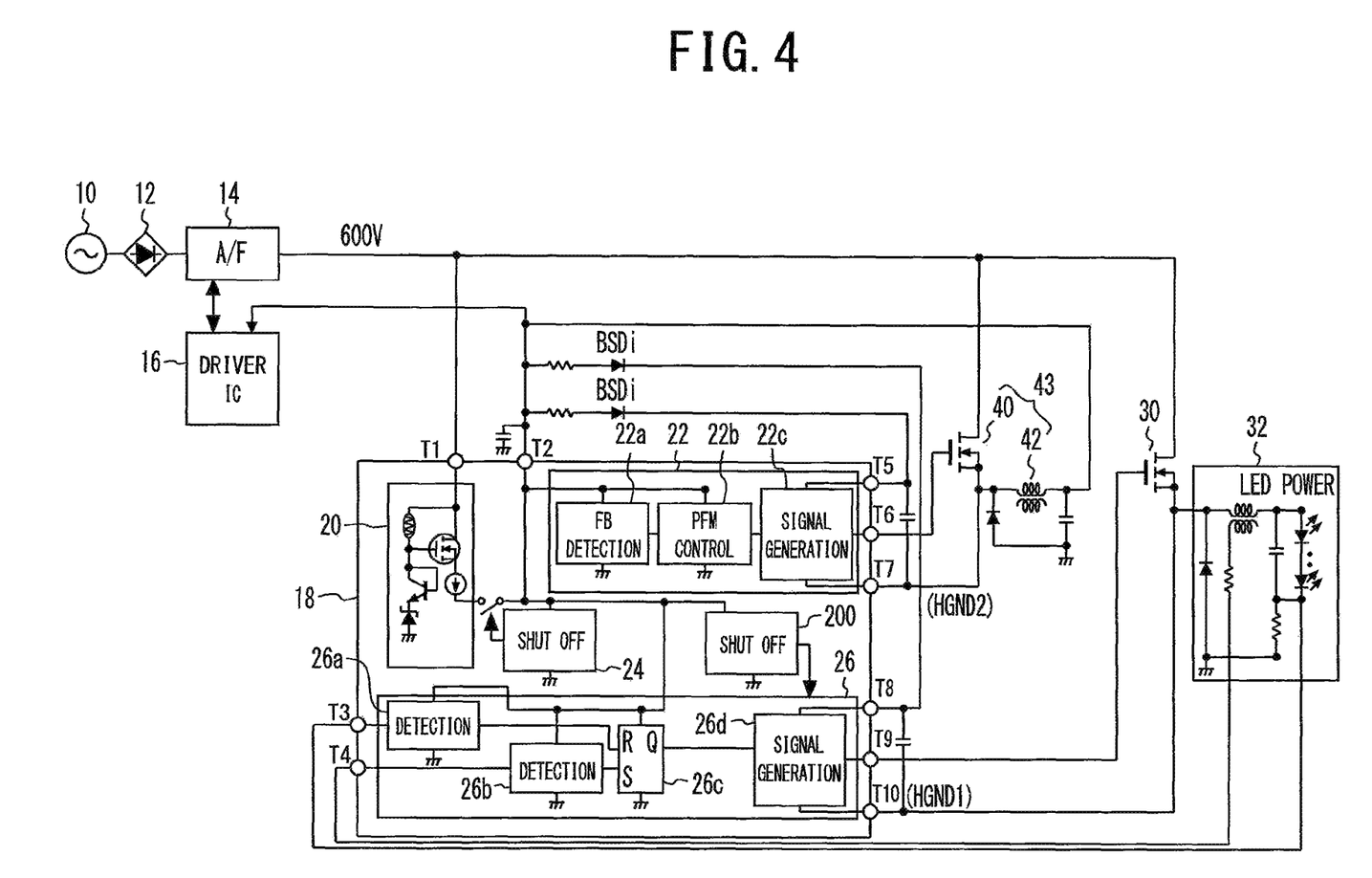
FIG. 4 is a circuit diagram of a control circuit and the like according to Embodiment 3.

FIG. 4 is a circuit diagram of a control circuit and the like according to Embodiment 3. The control circuit 18 includes a system shut off circuit 200. The system shut off circuit 200 is connected to the terminal T2 and senses Vcc supplied from the Vcc control circuit 22. The system shut off circuit 200 shuts down the drive circuit 26 when Vcc becomes lower than a predetermined voltage. While it has been mentioned in Embodiment 1 that mounting the drive circuit 26 and the Vcc control circuit 22 on a single chip makes system management easy, Embodiment 3 is one example thereof.

Embodiment 4

Figure 5:
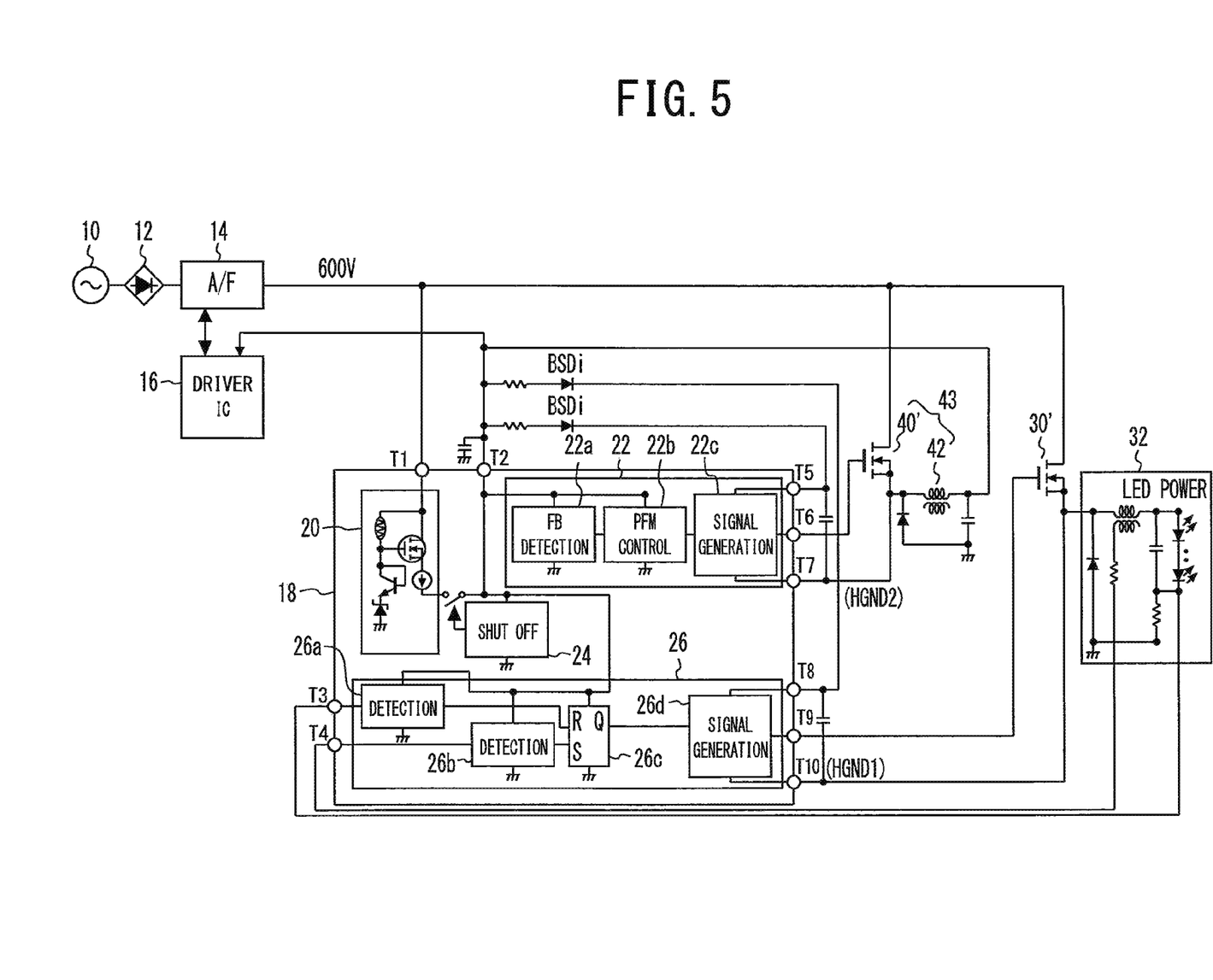
FIG. 5 is a circuit diagram of a control circuit and the like according to Embodiment 4.

FIG. 5 is a circuit diagram of a control circuit and the like according to Embodiment 4. Each of a first power device 30' and a second power device 40' is an FET made of a wide bandgap semiconductor. The wide bandgap semiconductor is silicon carbide, a gallium nitride material, or diamond. For example, the first and second power devices 30' and 40' are MOSFETs made of silicon carbide. The first and second power devices 30' and 40' made of a wide bandgap semiconductor make loss smaller and can be operated at higher temperature compared to the case where these power devices are made of Si.

It should be noted that features of the control circuits according to the above-described embodiments may be appropriately combined to improve advantageous effects of the present invention.

DESCRIPTION OF SYMBOLS

18 control circuit, 20 charging circuit, 22 Vcc control circuit, 24 shut off circuit, 26 drive circuit, 26a, 26b detection circuits, 30 first power device, 32 LED power supply portion, 40 second power device, 42 voltage conversion portion, 43 external converter, 150 power factor improvement circuit, 152 PFC control circuit, 200 system shut off circuit

The invention claimed is:

1. A control circuit comprising:
a drive circuit for outputting a gate drive signal;
a charging circuit for generating a charging current when the drive circuit is started up; and
a Vcc control circuit for, upon receiving an output from the charging circuit, outputting a control signal for supplying Vcc for the drive circuit, wherein
the drive circuit, the charging circuit, and the Vcc control circuit are provided in one chip,
the Vcc supplied to the drive circuit is based on the control signal output from the Vcc control circuit, and
the supplied Vcc is fed back to the Vcc control circuit and the outputted control signal is adjusted based on the Vcc fed back to supply to control Vcc to a predetermined value.

2. The control circuit according to claim 1, further comprising:
a first floating terminal connected to the drive circuit; and
a second floating terminal connected to the Vcc control circuit and insulated from the first floating terminal.

3. The control circuit according to claim 2, wherein the Vcc control circuit comprises:
a signal generation circuit for generating the control signal and controlling, using the control signal, an external converter provided outside the control circuit to generate the Vcc; and
a feedback circuit for detecting the Vcc generated by the external converter and transmitting a signal to the signal generation circuit to adjust the Vcc to a predetermined value.

4. The control circuit according to claim 3, wherein the control signal is applied to a gate of a second power device provided in the external converter, and
the second floating terminal is connected to a source of the second power device.

5. The control circuit according to claim 4, wherein the second power device is an FET made of a wide bandgap semiconductor.

6. The control circuit according to claim 2, wherein the gate drive signal is applied to a gate of a first power device provided outside, and
the first floating terminal is connected to a source of the first power device.

7. The control circuit according to claim 6, wherein the drive circuit comprises a detection circuit for detecting a current in a controlled portion controlled by the first power device, and
the drive circuit outputs the gate drive signal to adjust the current detected by the detection circuit to a predetermined value.

8. The control circuit according to claim 6, wherein the first power device is an FET made of a wide bandgap semiconductor.

9. The control circuit according to claim 8, wherein the wide bandgap semiconductor is any one of silicon carbide, a gallium nitride material, and diamond.

10. The control circuit according to claim 1, further comprising:
a power factor improvement circuit for controlling a voltage booster circuit for boosting a supply voltage, wherein the power factor improvement circuit is provided in the chip.

11. The control circuit according to claim 1, further comprising:
a system shut off circuit for shutting down the drive circuit when the Vcc becomes lower than a predetermined voltage,
wherein the system shut off circuit is provided in the chip.

12. The control circuit according to claim 1, wherein the Vcc control circuit comprises a signal generation circuit for generating the control signal and controlling, using the control signal, an external converter provided outside the control circuit to generate the Vcc.

13. A control circuit comprising:
a drive circuit for outputting a gate drive signal;
a Vcc circuit for supplying Vcc to the drive circuit;
a first floating terminal connected to the drive circuit; and
a second floating terminal connected to the Vcc circuit and insulated from the first floating terminal,
wherein
the Vcc circuit comprises:
a charging circuit for generating a charging current when the drive circuit is started up; and
a Vcc control circuit for, upon receiving an output from the charging circuit, outputting a control signal for supplying the Vcc, the supplied Vcc being fed back to the Vcc control circuit and the outputted control signal adjusted based on the Vcc fed back to supply to control Vcc to a predetermined value.

14. The control circuit according to claim 13, wherein the Vcc control circuit comprises a signal generation circuit for generating the control signal and controlling, using the control signal, an external converter provided outside the control circuit to generate the Vcc.

15. A control circuit comprising:
a drive circuit for outputting a gate drive signal;
a charging circuit for generating a charging current when the drive circuit is started up; and
a Vcc control circuit for, upon receiving an output from the charging circuit, outputting a control signal for supplying Vcc for the drive circuit; and
a shut off circuit for breaking connection between the charging circuit and the Vcc control circuit and breaking connection between the charging circuit and the drive circuit when the output from the charging circuit reaches a predetermined value,
wherein the drive circuit, the charging circuit, and the Vcc control circuit are provided in one chip.

16. The control circuit according to claim 15, wherein the Vcc control circuit comprises a signal generation circuit for generating the control signal and controlling, using the control signal, an external converter provided outside the control circuit to generate the Vcc.

\* \* \* \* \*